Feb. 21, 1961 L. L. GARMON 2,972,376
TIRE REGROOVING MACHINE
Filed April 9, 1958 5 Sheets-Sheet 1

Inventor
Lester L. Garmon

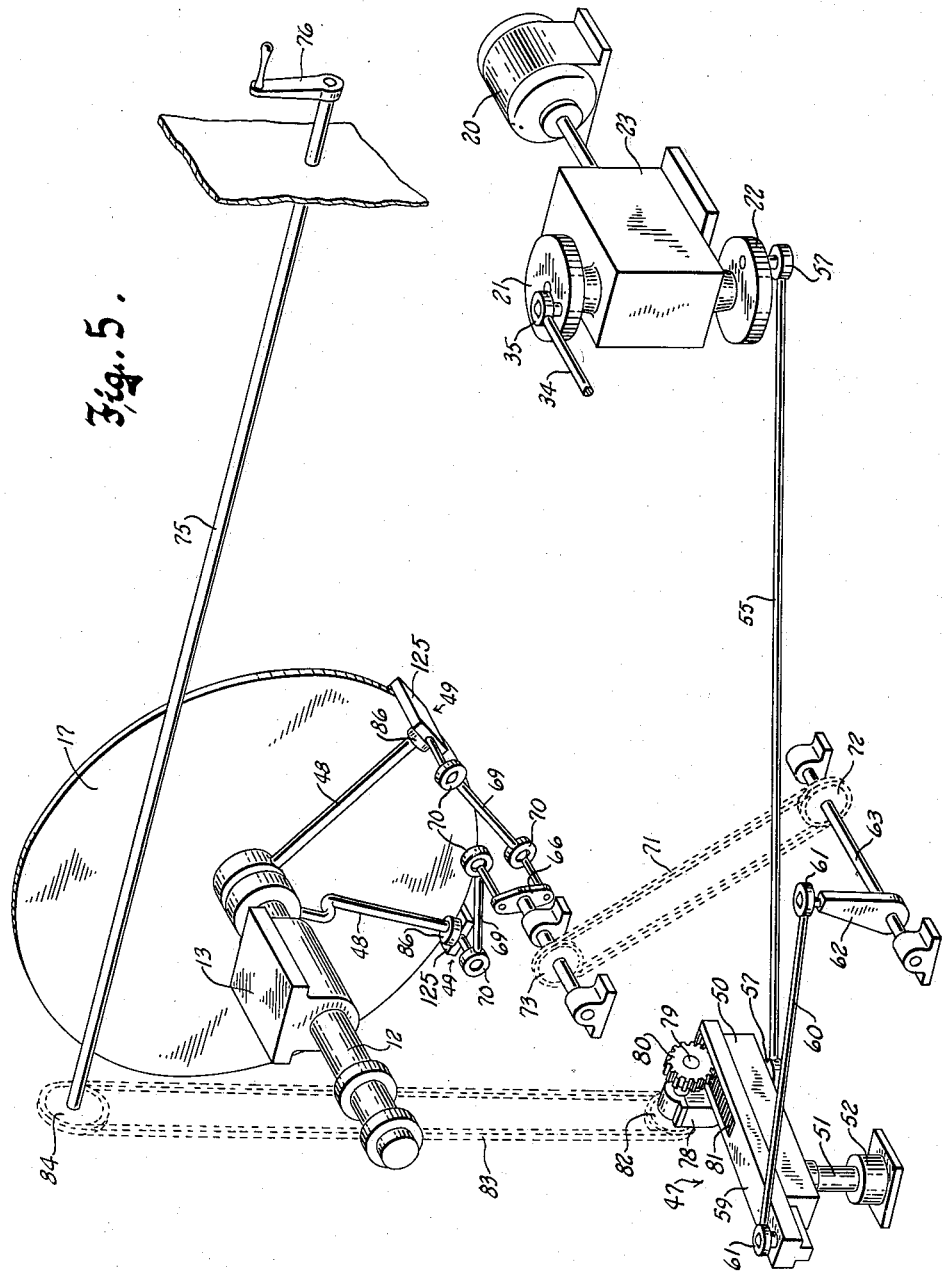

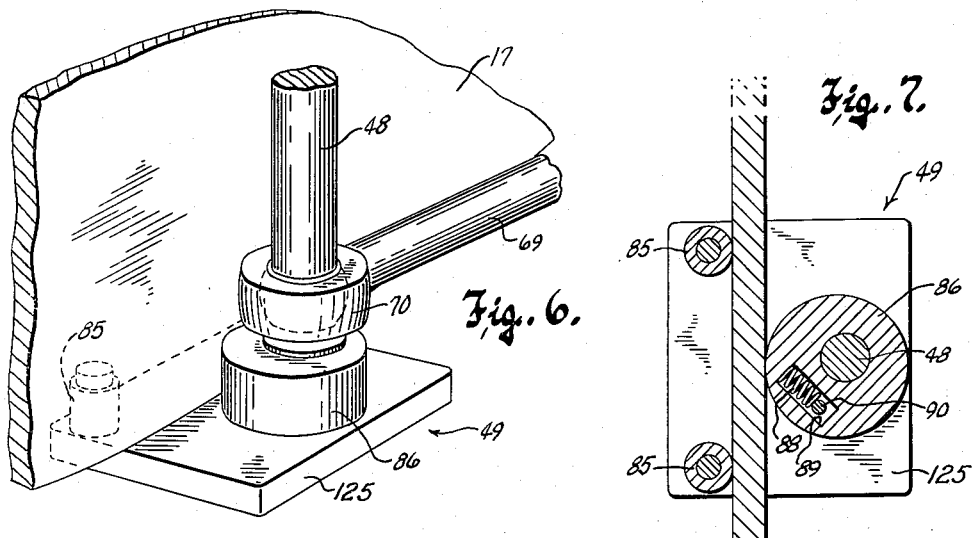
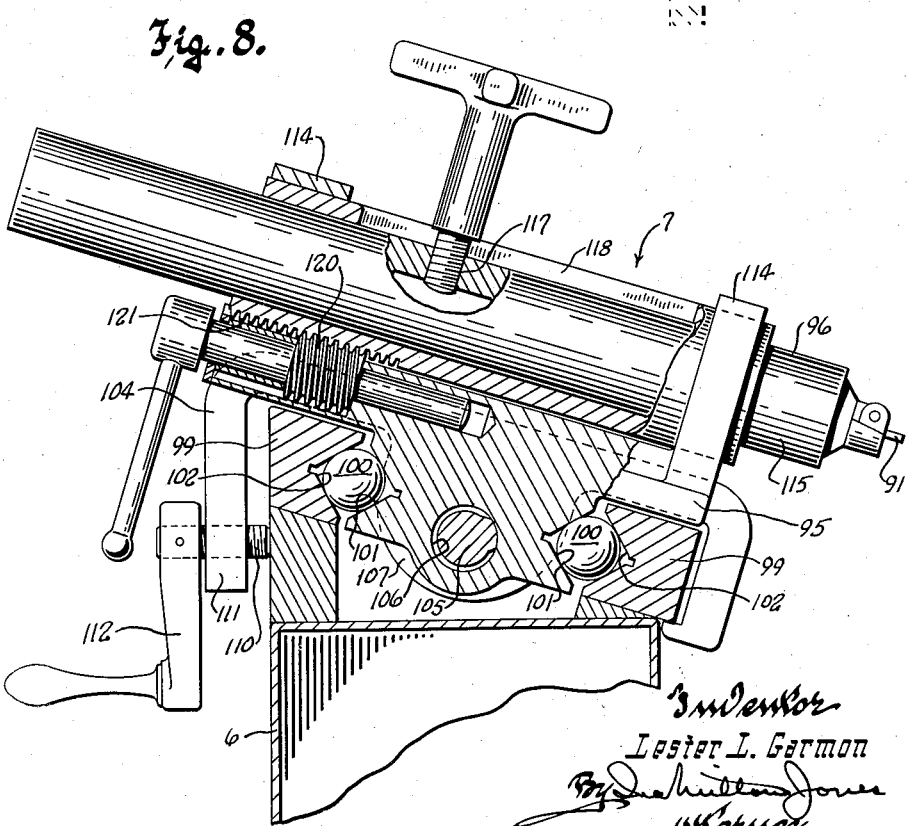

United States Patent Office 2,972,376
Patented Feb. 21, 1961

2,972,376
TIRE REGROOVING MACHINE
Lester L. Garmon, Milwaukee, Wis.
(2430 E. McDowell Road, Phoenix 8, Ariz.)
Filed Apr. 9, 1958, Ser. No. 727,336
9 Claims. (Cl. 157—13)

This invention relates to machines for grooving and regrooving tires and has for its general object the provision of a machine by which the grooving and regrooving of tires for automobiles and the like may be greatly facilitated and expedited.

It is well known that when the tread of an automobile tire wears down to the point where the tire is "bald" there is still a substantial layer of rubber on the tread surface of the tire and the tire still has a substantial useful life during the time that such remaining layer of rubber lasts. However, a bald tire does not provide effective road traction, and it is not only unsafe because of its inability to grip the road but is also uneconomical because of its tendency to spin ineffectively, abrading itself against the pavement without effecting propulsion of the vehicle.

For these reasons it has become a widespread practice to regroove bald or nearly bald tires in order to enable them to be used efficiently during the life that still remains after the original tread pattern has been worn off. Obviously it is desirable to regroove a tire before it has become completely bald, and for this reason it is desirable, in regrooving the tire, that the new tread pattern follow that which the tire originally had, for a deepening of the original tread not only affords a better appearance but also leaves a maximum of useful rubber on the road gripping surface of the tire and thus insures longer useful life.

With these facts in mind, it is an important object of this invention to provide a tire regrooving machine which is simple and rugged in construction, and therefore inexpensive to manufacture, operate and maintain, and with which an already existing tread pattern on the road gripping surface of a tire may be readily followed, to permit accurate deepening of the same.

Most of the tire regrooving machines heretofore known have not provided for the deepening of an existing groove pattern on a tire tread but have instead cut a predetermined pattern of new grooves which was the same for every tire, regardless of the existing tread pattern on the tire. A few prior regrooving machines have made provision for following an existing pattern of grooves to permit deepening of the original tread pattern. (See for example the patent to J. H. Ellis, No. 2,765,846.) Such machines, however, have required skillful manipulation on the part of the operator to follow the existing pattern, and only an experienced workman could produce completely satisfactory results with them.

So far as I am aware, every prior regrooving machine which cuts other than a straight circumferential groove has operated on the principle of rotating the tire to be regrooved and moving a knife or grooving cutter from side to side across the tread surface of the tire. When such a prior machine afforded the possibility of following an existing groove, the operator had to manipulate its controls to shift the cutter and rotate the tire at independently varying rates which would cause the tire and cutter to move in such relation to one another as to at all times keep the cutter in one of the existing grooves in the tire. Control manipulation on such a machine was obviously no simple task because the usual tread pattern includes many zigzags along the periphery of the tire, often with varying angles of zigzag around the tread, and the zigzag angle of the groove being cut or deepened around the road gripping face of the tire was, at any point, a function of both the rotational speed of the tire and of the rate of sideward movement of the cutter. However, the problem of control manipulation was further complicated by the fact that both the cutter and the tire were moving at all times during the regrooving operation, so that there was a constant movement of the cutting zone which made it difficult for the eye to follow the existing groove pattern as the tire rotated.

By contrast with the invariable past practice of providing a constantly moving cutting zone, the present invention has as one of its important objects the provision of a tire regrooving machine whereby a pre-existing groove may be followed and deepened and in which the cutting zone remains stationary, to thus simplify the problem of manipulating the controls of the machine in following the groove being deepened.

In this connection it is also an object of this invention to provide a tire regrooving machine having means for simultaneously rotating and axially reciprocating a tire to be regrooved, and wherein a groove cutter which is in cutting engagement with the tire remains stationary on the machine all during the cutting operation, so that cutting always takes place in a zone which is fixed relative to the operator and is therefore easily observed by him, thus enabling him to readily make adjustments and corrections in the relative positions of the tire and cutting tool.

Another object of this invention is to provide a tire regrooving machine having a tire carrier which is rotatable and axially reciprocable and wherein the rates of rotation and of axial reciprocation may be continuously and independently varied by means of simple and easily operated manual controls.

A more specific object of this invention resides in the provision of a tire regrooving machine of the character described having a single drive means for imparting both rotational movement and axial reciprocation to its tire carrier, and wherein variable fulcrum levers connect the drive means with the tire carrier to provide for independent and continuous variation of the rates of rotation and reciprocation of the tire carrier.

It is also a specific object of this invention to provide a regrooving machine having a tire carrier to which rotational motion in one direction may be intermittently imparted by power drive means, and wherein the motion transmitting connection between the drive means and the tire carrier includes a variable fulcrum lever which is adjustable by manually operable control means.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 5 is a more or less diagrammatic view of the mechanism by which rotational motion is imparted to the tire carrier and whereby the angle through which the tire carrier is rotated at each movement thereof may be controlled;

Figure 6 is a fragmentary perspective view of the unidirectional driving connection between the tire carrier and one of the arms by which rotational movement is imparted to it;

Figure 7 is a horizontal sectional view of the unidirectional drive means shown in Figure 6; and Figure 8 is a vertical sectional view of the cutter mounting and adjusting mechanism.

Figure 1:
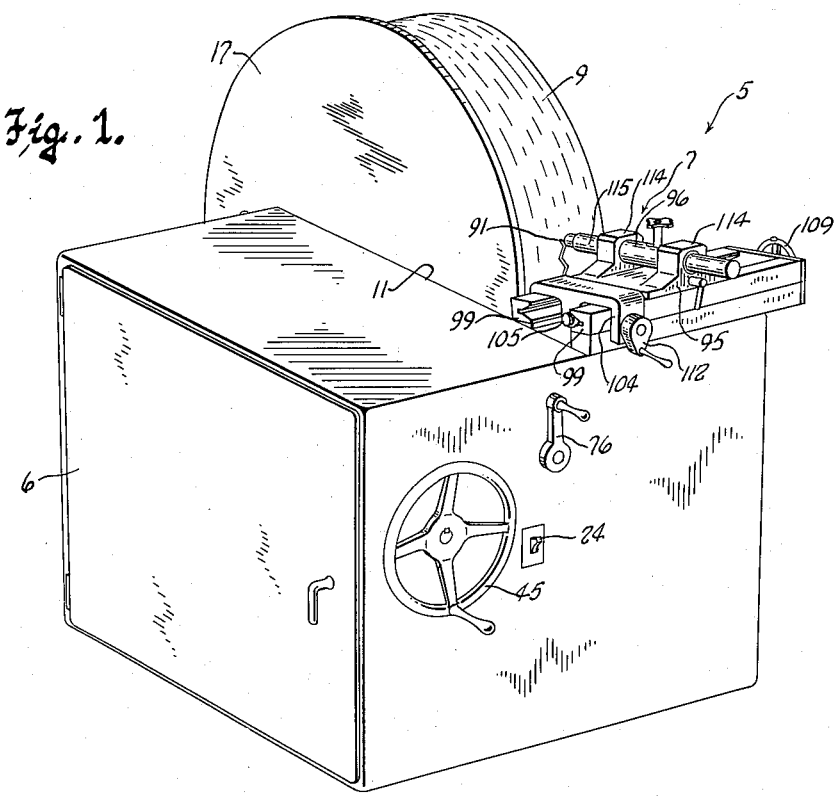
Figure 1 is a front perspective view of a tire regrooving machine embodying the principles of this invention, with a tire mounted thereon for regrooving.
Figure 2:
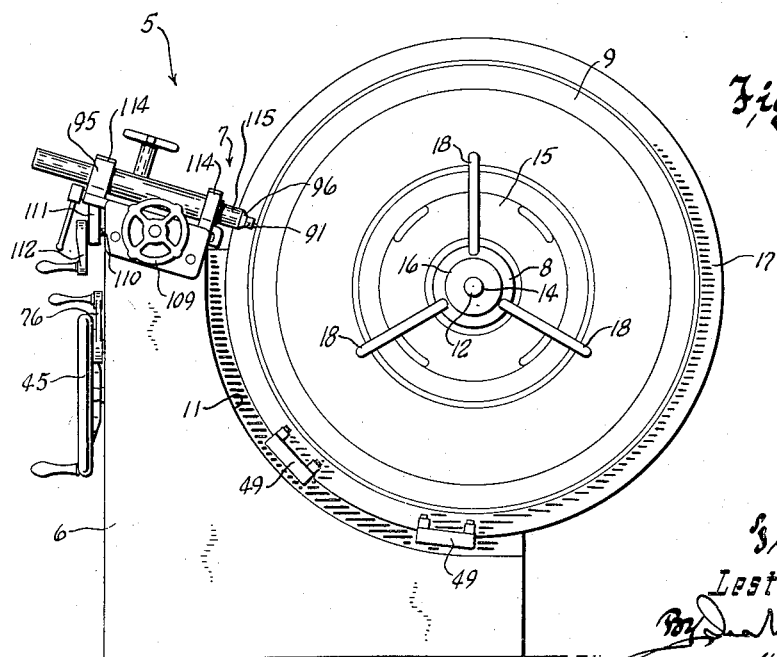
Figure 2 is a side elevational view of the machine shown in Figure 1, as seen from the tire carrier side thereof.
Figure 3:
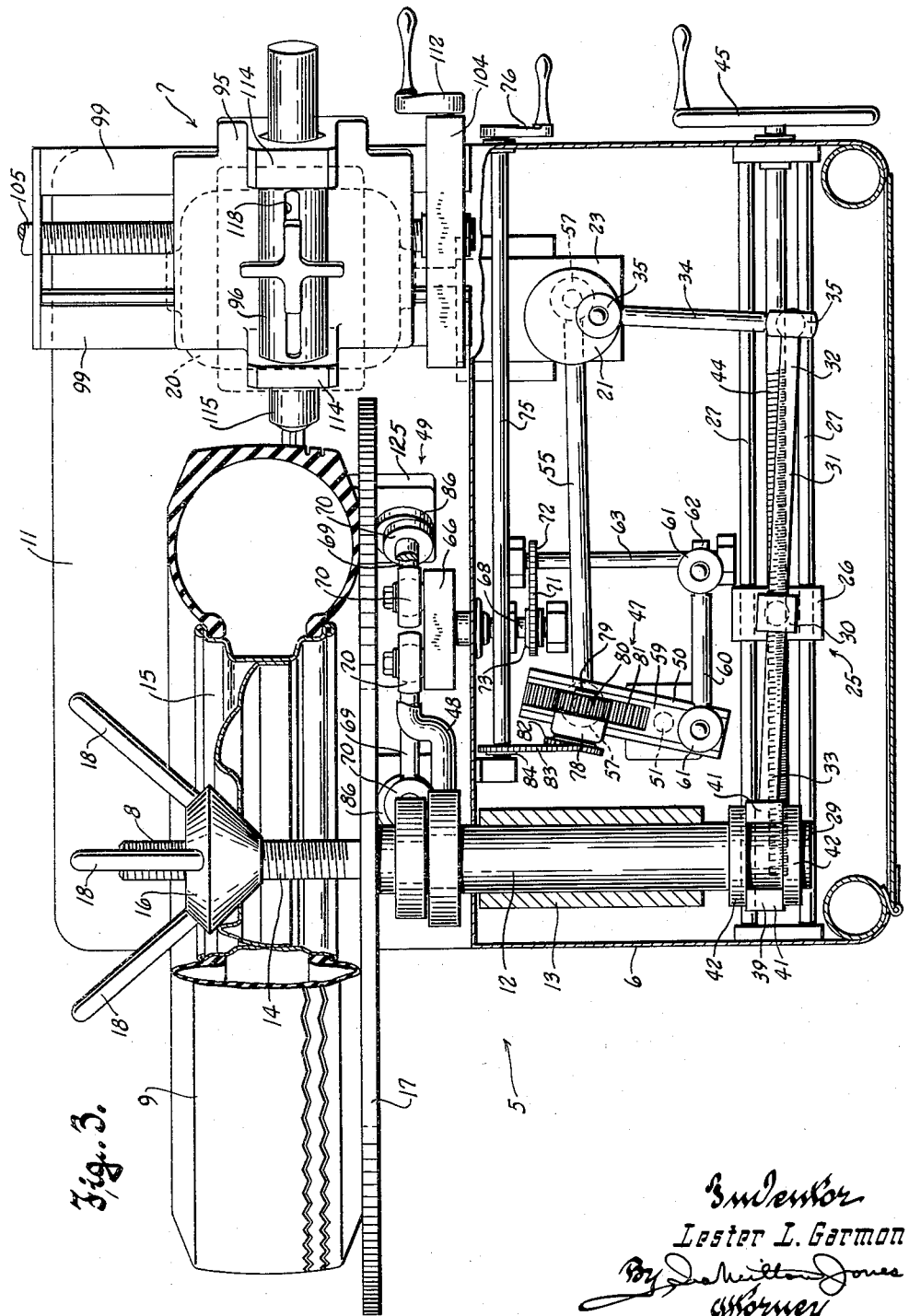
Figure 3 is a top elevational view of the machine with portions of the housing broken away to show the mechanism.

Referring now more particularly to the accompanying drawings, in which like numerals designate like parts throughout the several views, the numeral 5 designates generally a tire regrooving machine embodying the principles of this invention and comprising in general a housing 6 which provides a frame that supports a cutter assembly 7 and a tire carrier 8 adapted to carry a tire 9 to be regrooved, and which also supports and encloses mechanism (described hereinafter) for imparting to the tire carrier intermittent rotational motion and motion back and forth along its axis of rotation, and for independently controlling the magnitudes of the rotating and reciprocating motions of the tire carrier.

The housing 6 of the machine may comprise a substantially box like structure having a recess 11 at one side of it, opening to its top and rear, in which recess a tire to be regrooved may be accommodated.

The tire carrier 8 comprises a shaft 12 which is rotatably and axially slidably journaled in a bearing block 13 secured to a fixed part of the housing. One end portion 14 of the shaft projects out of the housing and into the recess 11, and a wheel 15, carrying a tire 9 to be regrooved, may be slid axially onto the projecting outer end portion of the shaft for securement thereto. The wheel 15 may be the same one on which the tire is mounted in use on a vehicle. When mounted on the tire carrier, the wheel is confined between a large disc 17 and a removable hub member 16, and it is constrained by these elements to rotate and axially reciprocate with the shaft. The disc 17 is exposed at the exterior of the housing, in the recess 11, and is spaced inwardly from the outer end of the shaft and anchored thereto. The outer extremity of the shaft is threaded to receive the nut-like removable hub member 16, which engages the central portion of the wheel and forces it toward the disc 17, so that the tire can be constrained to rotate with the shaft by reason of the frictional engagement between the disc and the adjacent side face of the tire. Radially projecting handles 18 on the hub member facilitate tightening it against the wheel.

Synchronized rotational and reciprocating movements are imparted to the shaft by means of an electric motor 20 which drives a pair of rotatable eccentrics 21 and 22 through a conventional gear box 23. The motor is controlled by a switch having its actuator 24 accessible at the front of the enclosure.

Figure 4:
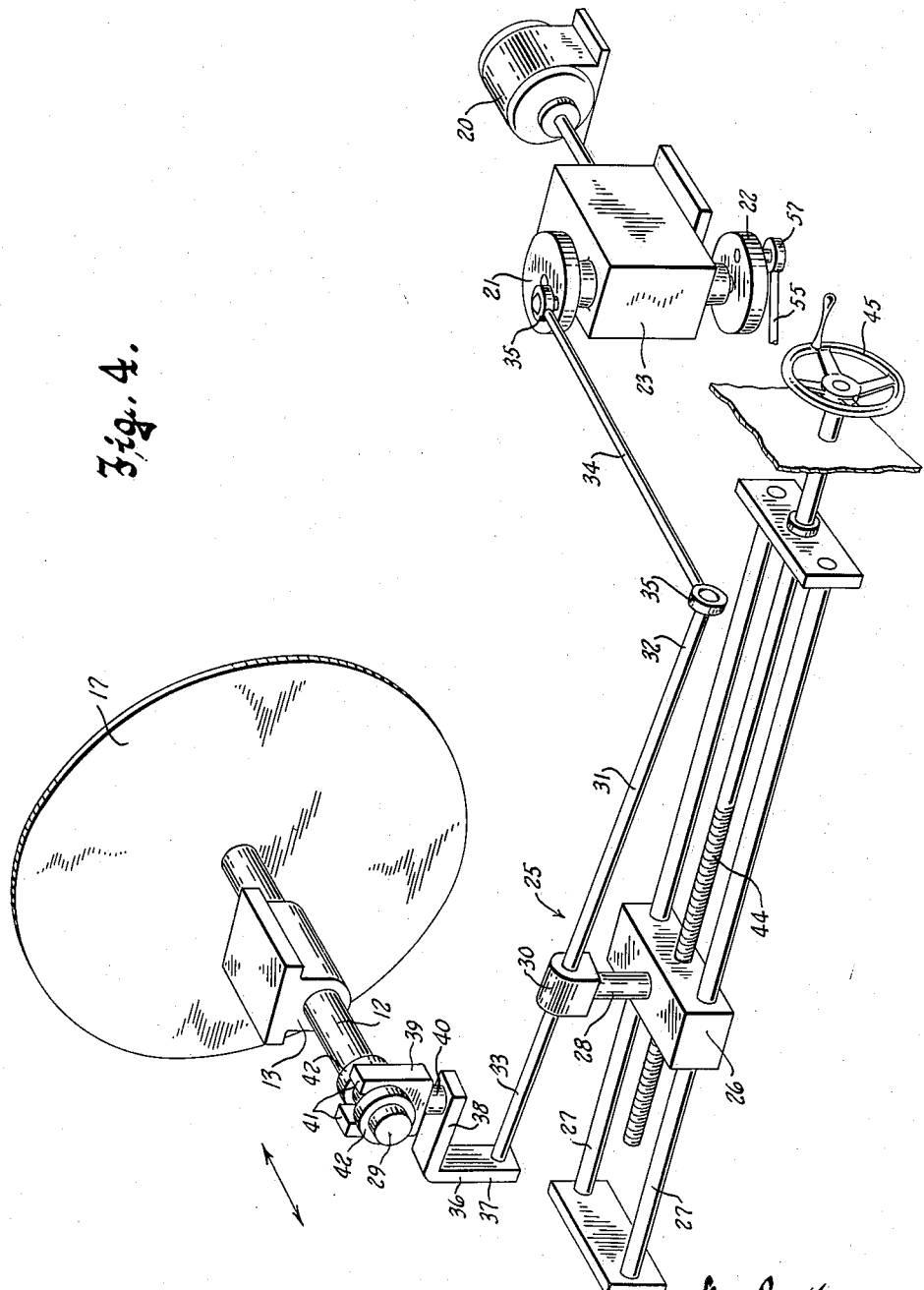
Figure 4 is a more or less diagrammatic perspective view of the mechanism by which the tire carrier is reciprocated and by which the magnitude of its reciprocating motion is controlled.

The eccentric 21 drives the shaft in axial back and forth movement through a transmission (shown in Figure 4) which includes a variable fulcrum lever, designated generally by 25, whereby the magnitude of the shaft's reciprocating motion may be regulated. The variable fulcrum mechanism comprises a carriage block 26 mounted for back and forth movement along a pair of rails 27 and which carries a rotatable trunnion 28. The rails 27, which may be straight rods secured to fixed portions of the housing in any desired manner, are spaced below the tire carrier shaft 12 and extend parallel to one another and transversely to the shaft from a point near the inner end 29 of the shaft. Swivelably mounted on top of the trunnion 28 is a block 30 which provides a fulcrum for a lever 31. The lever, which extends generally parallel to the rails 27, has its medial portion lengthwise slidable in a bore that extends through the fulcrum block 30, transversely to the trunnion axis.

The connection between the eccentric 21 and one end 32 of lever 31 comprises a link 34 having its opposite ends connected with said eccentric and with the lever by means of universal joints 35. This connection translates rotation of the eccentric into swinging motion of the end 32 of the lever about the trunnion axis. Secured to the other end 33 of the lever is an L-shaped bracket 36 having an upright leg 37 which projects upwardly from the lever and a horizontal leg 38 which extends over the lever, parallel thereto. Connecting this bracket with the shaft is a Y-shaped yoke 39 having its stem portion 40 pivotally secured to the horizontal leg 38 of the bracket and having its bifurcations 41 embracing the inner end portion of the shaft between a pair of collars 42 thereon.

The horizontal leg 38 of the bracket is spaced above the lever a distance sufficient to clear the fulcrum block 30 on the trunnion, to enable the trunnion to be moved to a position in which its axis is aligned with the pivotal axis of the yoke, in which position of the trunnion no reciprocating movement will be imparted to the shaft. As the trunnion is moved away from the shaft 12 along the rails 27 there will be a progressive increase in the magnitude of the reciprocating movement imparted to the shaft by the lever.

A lead screw 44 extends parallel to the rails 27, between them, and is rotatably but non-slidably journaled in a fixed part of the housing. The lead screw extends through a threaded bore in the carriage block 26, and a hand wheel 45, anchored to the front end of the lead screw and accessible at the front of the housing, provides for manual rotation of the lead screw by which the trunnion may be readily moved back and forth along the rails 27 for varying the magnitude of shaft reciprocation.

The connection between eccentric 22 and the tire carrier shaft, through which the eccentric imparts intermittent rotational movements to the shaft, is illustrated in Figure 5 and comprises a variable fulcrum lever designated generally by 47, a pair of arms 48 swingably mounted on the shaft and connected with the variable fulcrum lever to be swung thereby, and unidirectional drive means 49 at the ends of the arms and engaging the disc 17.

In this instance the pivot of the variable fulcrum lever 47 is fixed and one arm of the lever is lengthwise extensible and retractable relative to the pivot axis to provide the effect of a variable fulcrum arrangement. However, it will be understood that instead of the mechanism now about to be described, rotational movement could be imparted to the tire by a mechanism substantially similar to that of the tire reciprocating mechanism described above, and, vice versa, the tire reciprocating variable fulcrum mechanism could be substantially like that described hereinafter.

One arm of the variable fulcrum lever 47 comprises an elongated support 50 which projects radially in one direction from the top of a trunnion 51 that is journaled in and projects upwardly from a bearing 52 which is fixed with respect to the housing. A link 55 connects the swingable end of the support 50 with the eccentric 22, the connections at both ends of the link being provided by universal joints 57, so that rotation of the eccentric is translated into back and forth swinging motion of the support.

The top of the support is grooved lengthwise to provide a guideway in which a slide element 59 is mounted for endwise extending and retracting movement by which the outer end thereof is carried toward and from the axis of trunnion 51. A link 60, having universal joints 61 at its opposite ends, connects the outer end of the slide element with a crank arm 62 anchored to a rock shaft 63. The slide element thus cooperates with the support 50, providing the other arm of the variable fulcrum lever 47, and the magnitude of swinging motion imparted to the rock shaft 63 by slide element 59 will of course vary with the distance that the slide element is lengthwise extended from the support i.e., the distance between the trunnion axis and the slide element's point of connection with the link 60.

The arms 48, which carry the unidirectional drives 49, are coaxially swingably mounted on the shaft 12, adjacent to the disc 17 and at the side thereof opposite from that at which the tire to be regrooved is adapted to be mounted. The two arms 48 are actuated for simultaneous swinging movement in opposite directions by means of a rocking lever 66 medially anchored to a rock shaft 68 and having its opposite ends connected with the arms 48 by means of link rods 69. Each of the link rods 69 has universal joints 70 at both ends thereof. A drive chain 71 trained over sprockets 72 and 73 on rock shafts 63 and 68, respectively, constrains said two rock shafts to rock in unison; hence, when the variable fulcrum lever swings in one direction, one of the arms 48 will be swung in the direction of rotational advance of the tire by rocking lever 66, while the other arm 48 will be swung in the opposite direction.

The magnitude of the swinging movement of the arms 48 will of course be proportional to the amount by which the slide element 59 is extended from the support 50. The variable fulcrum lever 47 is adjusted by means of a shaft 75 rotatably mounted in the housing and having a manually operable crank 76 anchored to its front end and accessible at the front of the housing. Fixed on the support 50, near the free end thereof, is a bearing block 78 in which a pinion shaft 79 is medially journaled. On one projecting end portion of the pinion shaft is anchored a pinion 80 which meshingly engages a rack 81 that extends lengthwise along the top of the slide element, while a sprocket 82 is anchored to the other end portion of pinion shaft 79 and has an endless drive chain 83 trained thereover and around a sprocket 84 on the shaft 75. It will be seen that when the crank 76 is turned, the pinion 80 will be rotated by means of the endless chain 83, and the slide element 59 will be thereby extended or retracted, thus varying the magnitude of swinging motion imparted to the crank arm 62 and hence to the arms 48. The endless drive chain 83 provides a substantially flexible connection between the shaft 75 and the rack and pinion mechanism 80, 81 whereby the latter can swing back and forth with the support despite the fact that shaft 75 is confined against all but rotational motion.

Figures 6 and 7 illustrate details of the unidirectional drive 49 by which each arm 48 imparts rotational movement to the disc 17 as it swings in the direction of desired tire rotation. At the free end of each arm 48 is fastened a supporting block 125 which extends laterally from the arm, across the adjacent edge of the disc 17. A pair of rollers 85 are freely rotatably mounted on the block with their axes substantially parallel to the arm (i.e., radial to the shaft 12) and in rolling engagement with one face of the disc 17. The other face of the disc is engageable by an eccentrically mounted roller 86 on the block, the axis of which is substantially parallel to the roller axes. The eccentricity of roller 86 is such that as the block is carried in one direction by swinging movement of its arm, the roller is rollingly turned to bring its high portion into clamping engagement with the disc, whereby the disc is constrained to move with the arm; but when the block 125 is moved in the opposite direction the eccentric roller 86 is rollingly turned away from such clamping engagement with the adjacent face of the disc, permitting the arm 48 to move independently of the disc. To insure that the roller 86 will be rollingly clamped into driving engagement with the disc each time the arm 48 swings in the desired direction of disc rotation, the periphery of the roller must have constant contact with the disc face, and to this end a compression spring 88, confined in a slot 89 in the roller and reacting between the roller and a pin 90 fixed on the block, tends to turn said roller about its axis in the direction to keep its high portion in constant contact with the disc.

Since the arms alternately drive the disc 17 in rotational motion, and each arm goes through a full back-and-forth cycle of swinging motion during each rotation of the eccentric 22 it will be apparent that two rotational movements will be imparted to the disc at each revolution of the eccentric. It will also be apparent that the manually operable crank 76 provides a means for controlling the magnitude of rotational motion imparted to the disc 17 (and hence to the tire being regrooved) with each swing of the arms 48. Attention is directed to the fact that the arms 48 move bodily with the shaft 12 as the latter is axially reciprocated, and the links 69 accommodate the relative motion between said arms and the rocking lever 66.

The cutter assembly 7 in the machine of this invention provides for adjusting movement of a cutting element 91 mounted therein, but holds the cutting element stationary at all times during the cutting operation, while the relative rates of axial reciprocation and rotative advancing motion of the tire carrier are governed by means of the manually operable controls 45 and 76 to permit the deepening of a groove of any usual configuration in the tread surface of a tire. The cutter assembly comprises a carriage 95 mounted on the housing for adjusting motion in opposite directions parallel to the tire carrier axis, a cutter carrier 96 mounted on the carriage for side-to-side movement therewith and for movement relative to the carriage toward and from the tire carrier axis, and the cutting element 91, which may be a small gouge-like knife or hot wire cutter and which is carried by the cutter carrier for movement therewith.

The carriage 95 is mounted on a pair of spaced apart machine ways 99 on top of the housing, at the front thereof. Balls 100, confined in cooperating oppositely opening grooves 101, 102 in the carriage base and in the machine ways, respectively, confine the carriage to back and forth motion along the ways and provide bearings upon which it travels. Straddling and embracing the machine ways is a substantially U-shaped clamping member 104 which is connected with the carriage by means of a lead screw 105 that extends through a threaded bore 106 in the carriage and is rotatably but non-slidably journaled in a dependent portion 107 on the clamping member. Thus the lead screw normally constrains the carriage and clamping member to move in unison, but rotation of the lead screw, which is facilitated by a hand wheel 109 thereon, effects relative motion between them. The clamping member, and with it the carriage, may be fixed in any desired position of adjustment along the ways by means of a set screw 110 threaded into the front leg 111 of the clamping member and engageable with the front face of the ways. A manually operable crank handle 112 on the set screw facilitates tightening and loosening thereof.

It will be apparent that rapid adjustment of the carriage may be effected by loosening the set screw and manually moving the carriage to locate the cutting element in the approximate desired position across the tread face of the tire being regrooved, and then, after the set screw is tightened, the cutting element may be accurately positioned by means of the lead screw. In this way the cutting element may be readily shifted from groove to groove across the tread face of a tire, and can always be accurately placed in an existing groove.

Movement of the cutting element toward and from the axis of the tire carrier is provided for by the cutter carrier 96, which is mounted on the carriage for adjusting movement in opposite directions transversely to the direction of carriage motion. The cutter carrier is tubular and is mounted for limited axial sliding motion in coaxially bored ears 114 projecting upwardly from the front and rear of the carriage. Slidable in the bore of the cutter carrier is a cylindrical cutting element holder 115 which has the cutting element 91 fixed to its front end. A clamping screw 117 is threaded into the top of the cutting element holder through a closely fitting lengthwise extending slot 118 in the top of the tubular cutter carrier. When the clamping screw is loose, the cutting element holder 115 is freely slidable axially in the cutter carrier, to provide for rapid adjustment of the cutting element toward and from the tire tread, and the clamping screw provides a convenient handle for manually effecting such adjustment. The limits of adjusting motion of the cutting element holder are defined by engagement of the clamping screw with the ends of the slot 118. When the clamping screw is tightened, fine adjustment of the position of the cutting element may be effected by means of a feed screw 120 which is rotatably but non-slidably mounted in the carriage and has its threads engaged in a rack-like threaded portion 121 at the bottom of the cutter carrier. It will be apparent that this mounting of the cutting element permits it to be rapidly adjusted to accommodate tires of different radii and enables accurate control of the depth of the groove which it cuts in a tire.

In using the machine of this invention a wheel with a tire to be regrooved mounted thereon is removed from an automobile and is mounted on the tire carrier by slipping the wheel axially onto the tire carrier shaft 12 and tightening the threaded hub member 16 against it. The carriage is adjusted to align the cutting element with a groove to be deepened, and the cutting element holder is adjusted to engage the cutting element against the tire with the proper force for deepening the groove by the required amount. The drive motor is then started, and movement of the tire carrier is regulated in its simultaneous rotating and reciprocating motion by means of the manually operable controls 45 and 76, so as to cause the cutting element to remain in the existing groove being followed. Such regulation is greatly simplified by the fact that the cutting element remains stationary at all times during each cutting operation. After each groove is cut, the cutting element is moved over to the next adjacent groove and the operation is repeated.

From the foregoing description, taken together with the accompanying drawings, it will be apparent that this invention provides a tire regrooving machine which is capable of deepening an existing pattern of grooves in a tire tread, and with which the following of an existing groove is greatly simplified by reason of the fact that the cutting element is at all times stationary during the cutting operation, all movement which takes place during cutting being that of the tire carrier and the tire mounted thereon. It will also be apparent that the tire regrooving machine of this invention features unusual mechanical simplicity and is therefore low in cost, rugged, and easy to maintain.

What is claimed as my invention is:

1. In a tire grooving machine: a frame; a tire carrier mounted on the frame for rotation and for axial reciprocation, said tire carrier having securement means thereon for mounting a tire to be grooved and for constraining the tire to reciprocation and coaxial rotation with the tire carrier; drive means on the frame; transmission means connected with the drive means and with the tire carrier, and through which the drive means can impart intermittent rotational movement in one direction to the tire carrier; means manually operable during rotation of the tire carrier for varying the angle through which the tire carrier is rotated at each rotational movement thereof; other transmission means connected with the drive means and with the tire carrier, and through which the drive means can impart axial reciprocation to the tire carrier in timed relation to intermittent rotational movement thereof; means manually operable during reciprocation of the tire carrier for varying the magnitude of reciprocating movement imparted to the tire carrier; and a cutter mounted on the frame in a position to engage a tire on the tire carrier, said cutter being stationary during rotation and reciprocation of the tire carrier so that the configuration of a groove which the cutter cuts in a tire on the tire carrier is determined by the magnitudes of reciprocating and rotational movements of the tire carrier.

2. In a tire grooving machine: a frame; a tire carrier mounted on said frame for rotation and for axial reciprocation, said tire carrier having means for mounting a tire concentrically thereon to constrain the tire to rotate and axially reciprocate with the tire carrier; drive means including a pair of rotatable eccentrics on the frame; unidirectional drive means reciprocatingly mounted on the frame and by which rotation in one direction can be imparted to the tire carrier; a first lever having one end connected with one of said eccentrics and its other end connected with the tire carrier; a second lever having one end connected with the other of said eccentrics, and its other end connected with said unidirectional drive means; a pair of pivots, each adapted to provide a fulcrum for one of said levers whereby swinging motion can be imparted to said other end of each lever in consequence of rotation of the eccentric with which its first designated end is connected; means mounting one of said pivots and said first lever for motion relative to one another lengthwise of the lever, and fulcruming said first lever on said pivot, so that rotation of said one eccentric is translated into axial reciprocation of the tire carrier and the magnitude of such reciprocation is determined by the relative position of said one pivot along the length of the lever; means mounting the other of said pivots and said second lever for motion relative to one another lengthwise of said second lever and fulcruming said second lever on said other pivot so that rotation of said other eccentric is translated into reciprocation of the unidirectional drive means and thus into intermittent rotation in one direction of the tire carrier, the magnitude of such rotation being determined by the relative position of said other pivot along the length of said second lever; a cutter; means stationarily mounting the cutter on the frame; and means for independently manually adjusting the relative position of each of said pivots, whereby the configuration of a groove cut by said cutter in a tire on the tire carrier may be controlled.

3. In a tire grooving machine: a frame; a tire carrier mounted on the frame for rotation and for axial reciprocation and having means thereon for coaxially mounting a tire to be grooved to constrain the same to rotation and to axial reciprocation with the tire carrier; means including power drive means for imparting rotational movement in one direction to said tire carrier; a grooving cutter; means stationarily mounting the grooving cutter on the frame in a position to have cutting engagement with a tire on the tire carrier; a power driven eccentric on the frame; a lever connected at one end with said eccentric and connected at its other end with the tire carrier; a pivot on which said lever is adapted to be fulcrumed; means on the frame fulcruming said lever on the pivot and providing for relative motion between the lever and the pivot, lengthwise of the lever, whereby rotation of the eccentric is translated into reciprocation of the tire carrier, and the magnitude of such reciprocation depends upon the relative position of the pivot along the length of the lever; and means for manually adjusting the relative position of the pivot along the length of the lever to thus provide for control of the configuration of a groove being cut by the cutter.

4. In a tire grooving machine: a frame; a shaft mounted on the frame for axial reciprocation; means on said shaft for coaxially mounting thereon a tire to be grooved and for constraining the tire to reciprocate axially with the shaft; means for rotating a tire on the shaft; a cutter stationarily mounted on the frame in a position to have cutting engagement with a tire on the shaft; means on the frame providing a track extending transversely to the axis of the shaft; a pivot mounted on said track for movement therealong toward and from the shaft axis; a power driven eccentric; a lever having its medial portion lengthwise slidably fulcrumed on said pivot, having one end connected with said eccentric to be swung thereby about the pivot, and having its other end connected with the shaft to impart axial reciprocating motion to the shaft in consequence of swinging motion of the first designated end of the lever, the magnitude of the reciprocating motion of the shaft being dependent upon the position of the pivot along said track; and manually operable means for adjusting the position of the pivot along the track, to thereby regulate the configuration of the groove being cut by the cutter in the tread surface of a tire mounted on the shaft.

5. In a tire grooving machine of the type comprising a shaft having means for coaxially mounting a tire thereon for rotation with the shaft, a cutter engageable with a tire mounted on the shaft, and means for effecting relative motion parallel to the shaft axis between the shaft and the cutter, means for intermittently moving the shaft through predetermined angles of rotation, said means comprising: a disc coaxially secured to the shaft for rotation therewith; a pair of arms freely swingably secured to the shaft adjacent to the disc and extending radially from the shaft; means on each arm providing a unidirectional driving connection between the arm and the disc whereby motion of the arm about the shaft axis in one direction constrains the wheel to rotate in the same direction; linkage means connected with said arms and constraining the two arms to swing in opposite directions through substantiallly equal angles; a power driven eccentric; and means connecting the eccentric with said arms to cause the arms to swing back and forth through predetermined distances with each rotation of the eccentric, said connecting means including a lever connected at one end with the eccentric and at its other end with said arms, a pivot on which the lever is fulcrumed, means mounting the lever and pivot for relative motion lengthwise of the lever, and manually operable means for effecting adjusting relative movement of the location of the pivot along the length of the lever, whereby the arc of swing of the arms may be regulated.

6. In a tire grooving machine: a frame; a cutter; a rotatable tire carrier on which a tire may be coaxially mounted; means mounting the tire carrier on the frame for reciprocation parallel to the axis of rotation of the tire carrier; means mounting the cutter on the frame in a position to cuttingly engage the tread surface of a tire on the tire carrier; power drive means; a pair of eccentrics rotatably mounted on the frame and drivingly connected with the power drive means; first transmission means including a unidirectional drive connected with the tire carrier and with one of said eccentrics for translating rotation of said one eccentric into intermittent rotational movement of the tire carrier in one direction; second transmission means connected with the other of said eccentrics for translating rotational movement of said other eccentric into reciprocating movement of the tire carrier in timed relation to rotational movements of the tire carrier, said second transmission means including a variable fulcrum lever to enable variation of the magnitude of such reciprocating movement; and manually operable means for varying the location of the fulcrum of said lever to regulate the magnitude of said reciprocating movement.

7. A tire grooving machine of the type having a tire carrier on which a tire may be mounted for rotation, drive means for rotating the tire carrier, a cutter, and means for effecting reciprocating relative movement between the tire carrier and the cutter in directions parallel to the rotational axis of the tire carrier: characterized by the fact that said last named means comprises a variable fulcrum lever; and further characterized by means which are manually operable during the operation of the machine to vary the fulcrum of said lever and thereby regulate the magnitude of the reciprocating movement and thus control the configuration of a groove being cut by the cutter in a tire on the tire carrier.

8. A tire grooving machine of the type having a rotatable tire carrier on which a tire may be coaxially mounted, a cutter, means mounting the cutter and tire carrier for reciprocating relative motion parallel to the axis of rotation of the tire carrier, and drive means for effecting rotation of the tire carrier and for effecting such relative reciprocating motion, characterized by: transmission means connecting the drive means and the tire carrier and comprising a variable fulcrum lever connected with the drive means and a unidirectional driving connection between the variable fulcrum lever and the tire carrier, whereby the drive means imparts to the tire carrier intermittent rotation in one direction through angles determined by the location of the fulcrum of the variable fulcrum lever; and manually operable means for adjusting the position of the fulcrum of the variable fulcrum lever to provide for regulation of the magnitude of the angle through which the tire carrier is rotated at each rotational movement thereof.

9. The tire grooving machine of claim 5, wherein said means for imparting rotational movement in one direction to said tire carrier comprises: unidirectional drive means connecting said power drive means with the tire carrier to provide for intermittent rotational motion of the tire carrier in said one direction; and means manually adjustable during rotation of the tire carrier, connected with said unidirectional drive means for controlling the angle through which the tire carrier is rotated at each rotational motion thereof.

References Cited in the file of this patent
UNITED STATES PATENTS

| | | |
|---|---|---|
| 1,456,053 | Craver | May 22, 1923 |
| 1,521,238 | Gammeter | Dec. 30, 1924 |
| 1,738,692 | Constantinesco | Dec. 10, 1929 |
| 1,806,562 | Pichler | May 19, 1931 |
| 2,000,129 | Dunnan | May 7, 1933 |
| 2,009,524 | Schmidt | July 30, 1935 |
| 2,109,174 | Kalko | Feb. 22, 1938 |
| 2,119,567 | Williams | June 7, 1938 |
| 2,167,017 | Wikle | July 25, 1939 |
| 2,362,967 | Bivans | Nov. 21, 1944 |
| 2,393,294 | Crane | Jan. 22, 1946 |
| 2,548,807 | Morgan et al. | Apr. 10, 1951 |
| 2,737,237 | Herzegh | Mar. 6, 1956 |
| 2,749,979 | Prewett | June 12, 1956 |